(12) United States Patent
Hascoët et al.

(10) Patent No.: US 12,257,768 B2
(45) Date of Patent: Mar. 25, 2025

(54) DEVICE AND METHOD FOR DEPOSITING A GRANULAR MATERIAL IN ADDITIVE MANUFACTURE

(71) Applicant: ECOLE CENTRALE DE NANTES, Nantes (FR)

(72) Inventors: Jean-Yves Hascoët, Nantes (FR); Pascal Mognol, Rennes (FR); Tugdual Le Néel, Nantes (FR)

(73) Assignee: ECOLE CENTRALE DE NANTES, Nantes (FR)

( * ) Notice: Subject to any disclaimer, the term of this patent is extended or adjusted under 35 U.S.C. 154(b) by 825 days.

(21) Appl. No.: 17/624,239

(22) PCT Filed: Jul. 8, 2019

(86) PCT No.: PCT/EP2019/068308
§ 371 (c)(1),
(2) Date: Dec. 30, 2021

(87) PCT Pub. No.: WO2020/011736
PCT Pub. Date: Jan. 16, 2020

(65) Prior Publication Data
US 2022/0347922 A1  Nov. 3, 2022

(30) Foreign Application Priority Data
Jul. 7, 2018  (FR) .................. FR 1870817

(51) Int. Cl.
*B29C 64/153* (2017.01)
*B22F 10/28* (2021.01)
(Continued)

(52) U.S. Cl.
CPC .......... *B29C 64/153* (2017.08); *B22F 12/52* (2021.01); *B22F 12/67* (2021.01); *B29C 64/214* (2017.08);
(Continued)

(58) Field of Classification Search
CPC ... B29C 64/153; B29C 64/209; B29C 64/214; B29C 64/236; B29C 64/255;
(Continued)

(56) References Cited

U.S. PATENT DOCUMENTS

2004/0265413 A1* 12/2004 Russell ............... B41J 29/17
425/375
2015/0306819 A1  10/2015 Ljungblad
(Continued)

FOREIGN PATENT DOCUMENTS

DE  202017003867 U1  8/2017
JP  H08127024 A  *  5/1996  ............ B29C 31/02
WO  2017018935 A1  2/2017

OTHER PUBLICATIONS

DE202017003867U1 _Machine Translation (Year: 2017).*
(Continued)

*Primary Examiner* — Yunju Kim
(74) *Attorney, Agent, or Firm* — H&I PARTNERS; Chai Im; C. Andrew Im (57) ABSTRACT

A device for depositing a layer of granular material on a deposition surface. The device includes a discharge hopper, a scraper, and a transporter to move the discharge hopper and the scraper relative to the deposition surface. The hopper includes a plurality of discharge holes, aligned in a transverse direction, a top portion and a conical bottom discharge portion. The bottom discharge portion includes two transverse walls that are inclined towards the discharge holes. Each compartment, of a transverse compartmentalization of the discharge portion, includes two walls perpendicular to the transverse walls of the conical bottom discharge portion and inclined towards the discharge holes. Each compartment facing a discharge hole forms a pyramid-shaped conduit in the bottom discharge portion. The consecutive walls of the
(Continued)

two compartments being joined at a corner where they meet in the bottom discharge portion.

13 Claims, 4 Drawing Sheets

(51) Int. Cl.
  *B22F 12/52* (2021.01)
  *B22F 12/67* (2021.01)
  *B29C 64/214* (2017.01)
  *B29C 64/236* (2017.01)
  *B29C 64/329* (2017.01)
  *B33Y 10/00* (2015.01)
  *B33Y 30/00* (2015.01)
  *B33Y 40/00* (2020.01)

(52) U.S. Cl.
  CPC .......... *B29C 64/236* (2017.08); *B29C 64/329* (2017.08); *B33Y 10/00* (2014.12); *B33Y 30/00* (2014.12); *B33Y 40/00* (2014.12); *B22F 10/28* (2021.01)

(58) Field of Classification Search
  CPC ..... B29C 64/329; B29C 64/165; B33Y 30/00; B33Y 40/00; B22F 12/52; B22F 12/55; B22F 12/67; B22F 12/57; B22F 10/28
  See application file for complete search history.

(56) References Cited

U.S. PATENT DOCUMENTS

2019/0060998 A1* 2/2019 Kelkar .................. B29C 64/218
2019/0126545 A1* 5/2019 Chanclon ................ B29C 31/02

OTHER PUBLICATIONS

JPH08127024A_Machine Translation (Year: 1996).*
WO2020011736A1—Machine Translation (Year: 2020).*
A.W. Jenike, "Storage and flow of solids," Bulletin No. 123 of the Utah Engineering Experiment Station, Nov. 1964, pp. 1-198, vol. 53, No. 26, University of Utah, Salt Lake city, Utah, USA.

* cited by examiner (prior art)

Fig. 1

(prior art)

DEVICE AND METHOD FOR DEPOSITING A GRANULAR MATERIAL IN ADDITIVE MANUFACTURE

RELATED APPLICATIONS

This application is a § 371 application of PCT/EP2019/068308 filed Jul. 8, 2019, which is incorporated herein by reference in its entirety.

TECHNICAL FIELD

The invention pertains a device and a method for depositing a granular material for additive manufacturing. The invention is adapted to the implementation of an additive manufacturing method using selective sintering, selective melting or selective spraying of binder on a granular material bed, the granular material being a polymer powder, a metal powder, a sand or a ceramic powder.

BACKGROUND OF THE INVENTION

These additive manufacturing methods consist in their principle of selectively agglomerating, by melting, sintering or spraying a binder, the grains of a granular material in a layer of defined thickness, deposited on a layer of granular material having previously been subject to the same selective agglomeration process. The term "agglomeration" is here considered in a broad sense, the different considered methods producing very different natures of bonds between the grains subjected to the selective effect.

The selectively agglomerated portion of said layer is bound to the selectively agglomerated portion of the preceding layer, and the part which is the subject matter of the manufacturing method is thus manufactured by stratification o successive layers. The finished part is then extracted from the granular material bed.

These methods require to deposit a layer of granular material of controlled thickness on the material bed, before each selective melting, sintering or spraying of binder passage.

Figure 1:
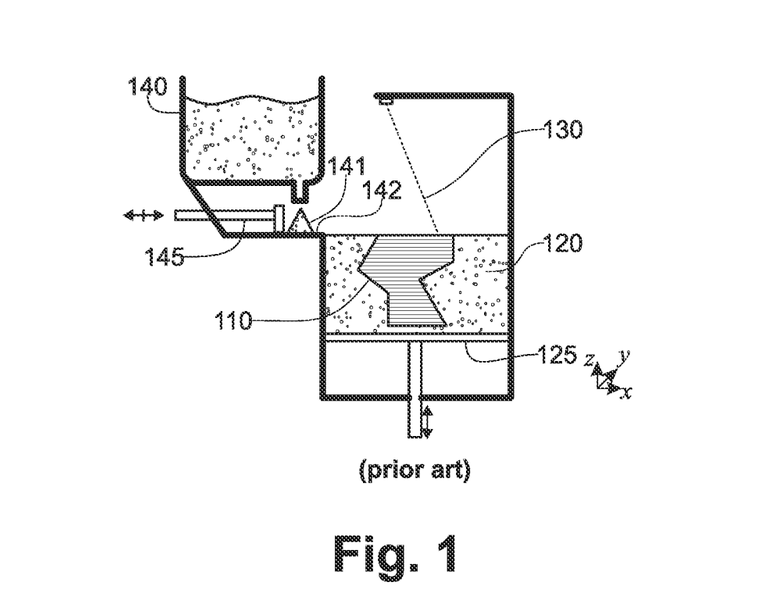
FIG. 1 and FIG. 2, relative to the prior art, show embodiment variants of an additive manufacturing method by selective agglomeration in a material bed.

FIG. 1 relating to prior art represents an exemplary embodiment of such a method. The part (110) is made by a stratification of successive layers by selectively agglomerating the grains in a granular material bed (120). The selective agglomeration is, as for instance, done by sintering, by exposing zones in a layer of the granular material bed to a laser radiation (130), the movement of which on said bed (120) is controlled according to a defined path.

The granular material bed is placed on a plate (125) which is vertically movable by means of a controlled jack, for example a jack screw or a linear motor.

Initially, the plate (125) is located up to the table (142). A hopper (140) contains a granular material reserve.

By non-shown means, a pile (141) of granular material is dispensed by the hopper (140) on the table (142).

The plate (125) descends from the thickness of the layer to be created and a scraper (145) is moved parallel to the surface of the plate (125) to push the pile (141) of material and to distribute it according to a uniform layer of thickness on said surface of the plate.

The agglomeration means (130) enter into action and selectively agglomerate a stratum of the part in the layer thus deposited.

Then, the plate (125) descends again from a layer thickness. The hopper (140) delivers a new pile of material which is distributed on the preceding layer by the scraper (145), and so on, until the part (110) is fully produced.

The operation of depositing the layer of granular material according to this method, as well as its variants, poses difficulties for obtaining a uniform layer of thickness, particularly, but not exclusively, when the surface of the material bed is significant.

The pile (141) of material is initially more difficult to push and to distribute than at the end of the distribution, such that the layer is not directly of uniform thickness. The scraper (145) equalizes this during its return, in return a quantity of material greater than what is necessary must be deposited to allow this equalization.

Even if this quantity of surplus material is recoverable, it is necessary to provide the means for this recovery, which complexifies the machine and increases its cost.

This method for depositing the layer of material is not adapted to an additive manufacturing machine using cylindrical kinematics. Document US 2015/0306819A1 gives an example of such a machine.

Figure 2:
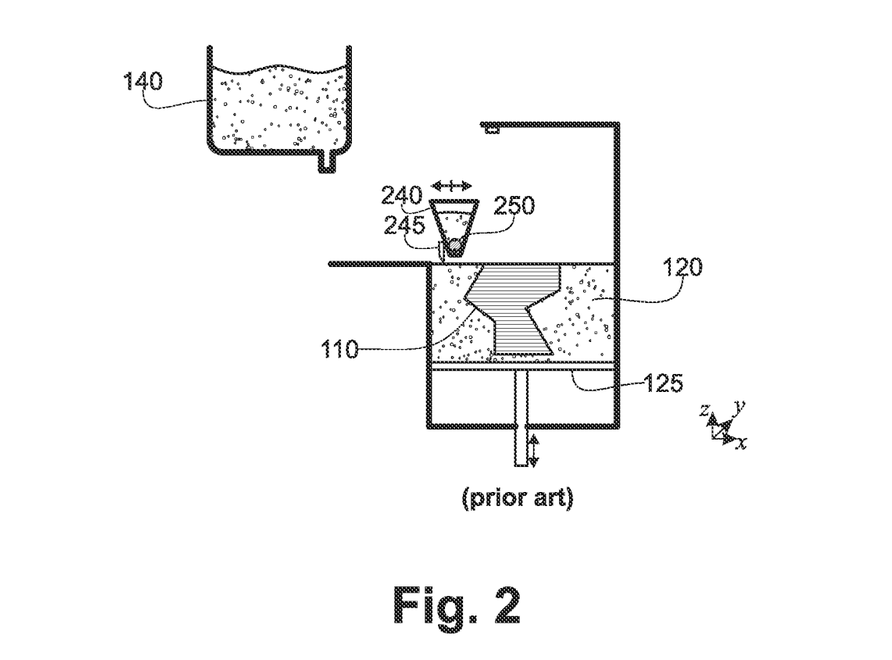

FIG. 2, according to another embodiment of the prior art, the layer of material is deposited by way of a mobile hopper (240). A scraper (245) is placed in front of or behind said hopper.

According to an exemplary embodiment, the hopper (240) comprises, in the vicinity of its lower opening, a cylinder with notches (250) driven in rotation by a stepper motor (not represented). Prior to the deposition of the layer, the hopper is filled with a necessary quantity of material, equal or slightly greater than the quantity of material required for the layer to be deposited.

Thus, by controlling the rotation of the notched cylinder (250) during the movement of the hopper above the material bed, the quantity, or more specifically, the flow of material deposited is controlled so as to obtain a uniform layer of deposition.

However, if this device allows to control the quantity of material deposited in the movement direction of the hopper (direction x in this figure), the uniformity of the layer in the direction y parallel to the plate (125) is perpendicular to the movement direction of the hopper, depends on the falling conditions, by gravity, of the granular material. The equalizing effect of the scraper (245) in this same direction (y) is limited, this is moved in the same direction as the hopper.

In addition, in the case where a part comprising different materials about the axis z is produced, which the additive manufacturing method allows, it is necessary to deposit successive layers of different materials.

During each change of material, it is thus necessary to proceed with a complete cleaning of the hopper to remove the material previously deposited in it, and which is trapped in particular in the notches around the dosing cylinder (250). These cleaning operations are tedious and extend the time to produce the part.

The flow of a granular material in a hopper depends, among others, on:
  the nature of the material and its grain size;
  the friction coefficient of said material on the inner walls of the hopper;
  the surface of the opening at the bottom of the hopper;
  the angle of the cone at the bottom of the hopper.

All these parameters interact together to define the discharge mode and flow rate. All in all, the discharge conditions are more favorable when the hopper is high and narrow and the angle at the top of the discharge cone is low. In addition, the smaller the surface of the opening at the bottom of the hopper, i.e. an opening with a low diameter, the more the angle at the top of the cone shall be reduced, so as to ensure a uniform flow of the material.

A hopper adapted to the deposition of a layer of granular material in an additive manufacturing method that is designed following the latter principles, will exhibit a significant vertical dimension, with the consequences in terms of machine design.

In addition, while the general design principles of a discharge hopper are relatively documented in the case of hoppers intended to discharge very large volumes of materials, in practice, tens of m$^3$, for example according to the equations described in particular by Jenike, A. W., "*Storage and flow of solids,*" Bulletin #123 *of the Utah Engineering Experiment Station*—November 1964.

In the case of a hopper intended to discharge the granular material to constitute a layer of additive manufacturing, the volume of material deposited to produce a layer is around 100 cm$^3$.

Thus, regarding industrial discharge hoppers used for the transshipment of powdery products, the application targeted by the invention is located in a scale factor of around 10$^{-5}$ to 10$^{-6}$ in terms of volumes and flows.

OBJECT AND SUMMARY OF THE INVENTION

The invention aims to solve the disadvantages of the prior art and to this end, pertains to a device for depositing a layer of granular material on a deposition surface, the device comprising:
  a discharge hopper;
  a scraper;
  means for moving the discharge hopper and the scraper relative to the deposition surface;
  and wherein the hopper comprises:
  a plurality of discharge holes aligned in a transverse direction;
  a top portion and a bottom conical discharge portion, the bottom portion comprising two transverse walls inclined towards the discharge holes;
  a transverse compartmentalization of the discharge portion, each compartment comprising two walls perpendicular to the transverse walls of the conical discharge portion and inclined towards the discharge hole so as to form a pyramid-shaped conduit in the bottom discharge portion facing each discharge hole, the consecutive walls of two compartments being connected in a wedge shaped connection where they meet in the bottom discharge portion.

Thus, the granular material initially loaded in the discharge hopper is discharged through each hole through a specific hopper, specific to this hole, according to a flow defined by the characteristics of this specific hopper, discharging on the deposition surface a pile extending in a strip in the direction of motion of the hopper, of a uniform height defined by the motion speed.

The thickness of the material thus deposited is made uniform by the scraper so as to form a layer adapted to the subsequent additive manufacturing operation.

The material strips thus deposited being close to each other, they are easily equalized and distributed on the deposition surface during the motion of the scraper. There is no mobile dosing device in the hopper, the wedge shaped connection of the compartmentalization walls, and the inclination of the walls, make it that no material residue subsists after the emptying of the hopper, such that different materials can be deposited successively without having to clean the hopper.

The invention is advantageously implemented according to the embodiments and the variants disclosed below, which are to be considered individually or according to any technically possible combination.

Advantageously, the inclination angle relative to the vertical direction of the two inclined transverse walls of the bottom portion, as well as of the two compartmentalization walls for one same hole, is less than or equal to 40°.

These conditions allow to obtain a discharging according to a mass flow in the hopper, and thus obtaining a substantially constant flow of material in each hole during the deposition.

Advantageously, the inside of the hopper comprises a coating the friction coefficient of which with the deposited granular material is less than 0.1.

Advantageously, the hopper comprises a vibration device installed on an outer wall.

These two characteristics taken individually or in combination allow to reduce the apparent friction coefficient between the granular material and the hopper and thus to use inclination angles in the discharge portions, bottom walls of the hopper and compartmentalization walls, more open, typically closer to 40°, while preserving a mass flow of the material. Thus, the vertical bulk of the hopper is reduced.

According to one embodiment, the holes of the discharge hopper are distributed according to a regular interval along the transverse direction.

According to another embodiment, the hopper comprises three holes or more, distributed according to a non-regular interval along the transverse direction.

Also, according to another embodiment, compatible with the two preceding ones, the hopper comprises a hole having an outlet cross-section different from that of another hole.

These characteristics allow to modulate the quantity of material deposited by the hopper in the transverse direction, and thus to adapt the deposition of material, for example in the case of a circular path of the hopper on the deposition surface, for example in the case of a cylindrical kinematic machine.

Advantageously, the scraper of the device of the invention comprises reliefs opposite each hole of the hopper. Thus, the equalization of the deposited layer is facilitated.

The invention also pertains to a method for depositing a layer of granular material on a deposition surface implementing the device of the invention according to any one of its embodiments and comprising the steps of:
  i. filling the discharge hopper with a first granular material;
  ii. moving the discharge hopper above the deposition surface according to a defined path traveled at a defined speed;
  iii. depositing during step ii) the material on the deposition surface in continuous and parallel strips;
  iv. spreading by means of a scraper, the material deposited in step iii) on the deposition surface so as to obtain a layer of uniform thickness.

Advantageously, the method, of the invention comprises, after step iv), the steps of:
  v. filling the hopper with a second granular material different from the first one;
  vi. repeating steps ii) to iv) with the second granular material.

Thus, the method of the invention allows to produce parts comprising constitution variations in the stratification direction.

BRIEF DESCRIPTION OF THE DRAWINGS

The invention is disclosed below according to its preferred embodiments, not at all limiting, and in reference to FIGS. 1 to 8, wherein:

FIG. 5 schematically shows an example of deposition with the device of the invention, FIG. 5A with a scraper placed behind the hopper and FIG. 5B with a scraper placed in front of the hopper;

DETAILED DESCRIPTION OF THE EMBODIMENTS

Figures 3, 3A, 3B:
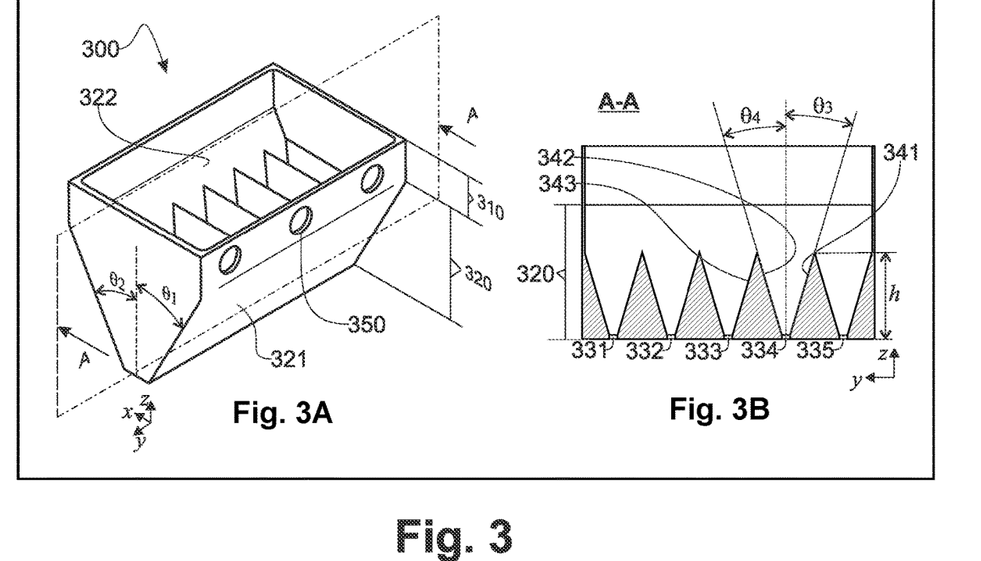
FIG. 3 represents an exemplary embodiment of the hopper for deposition in the device of the invention.
FIG. 3A illustrates a perspective view and FIG. 3B illustrates a cross-sectional view AA.

FIG. 3A, according to an exemplary embodiment, the hopper (300) of the device of the invention is generally wedged shaped and comprises a top portion (310) and a bottom portion (320) so-called discharge portion, comprising two inclined walls (321, 322) converging towards the bottom openings of the hopper, said openings being distributed in a transverse direction (y).

The hopper (300) comprises, in its top portion, means for fixing it in an additive manufacturing machine, in particular by bolting and in particular to a carriage, the motion speed of which is controlled.

According to this exemplary embodiment, the two inclined walls (321, 322) of the bottom portion (320) of the hopper are symmetrically inclined facing a transverse vertical plane (x, y), by an angle $\theta_1=\theta_2$.

Alternatively, the two walls are inclined according to angles ($\theta_1$, $\theta_2$), different relative to the transverse vertical plane. The tilt angle ($\theta_1$, $\theta_2$) of a wall being counted between 0°, for a vertical wall, and 90° for a horizontal wall, whatever the wall, these angles ($\theta_1$, $\theta_2$) are in any case less than 40° and preferably less than 30°, such that the angle of the discharge cone ($\theta_1+\theta_2$) between the two inclined transverse walls (321, 322) of the bottom portion, is at most equal to 80° and preferably less than 60°.

FIG. 3B, the hopper is compartmentalized in its bottom portion (320).

Each compartment corresponds to a hole (331, 332, 333, 334, 335), the hopper comprising several holes aligned in the transverse direction (y). Each compartment constitutes a conical hopper of evolving rectangular cross-section in the discharge portion (320) of the hopper of the device of the invention.

This "sub-hopper" facing each hole is delimited in the longitudinal direction (x) by the inclined walls (321, 322) of the hopper (300) and in the transverse direction (y) by compartmentalization walls (341, 342) inclined with respect to a longitudinal vertical plane (x, z) and converge towards a hole.

Each compartmentalization wall is inclined by an angle ($\theta_3$, $\theta_4$) less than 40°, preferably less than 30°, such that the opening angle ($\theta_3+\theta_4$) between two compartmentalization walls leading to a hole, is at most equal to 80° and preferably less than 60°.

The conduit thus created between the inclined walls and the compartmentalization walls down to the outlet of the hole, does not comprise any surface inclined by an angle greater than 40° relative to the vertical direction. These conditions ensure a fluid flow of the granular material contained in the hopper (300), in the form of a mass flow, towards each of the holes (331, 332, 333, 334, 335) of the hopper (300).

The geometry of the compartments bringing the material towards the holes is such that the actual flow cross-section through a hole is equal or substantially equal to the cross-section of the hole during almost all of the time for emptying the hopper (300).

The actual cross-section is the cross-section of the material flowing through the hole. This actual cross-section can only be less than or equal to the cross-section of the hole.

In the case of the hopper of the device of the invention, this actual cross-section, for each hole, is equal to the cross-section of said hole, from the filling of the hopper (300) and the beginning of the discharge of the granular material and as long as the height of granular material contained in a compartment is sufficient for ensuring this condition.

At the very end of emptying, the actual discharge cross-section is possibly less than the cross-section of the hole, but this is a marginal effect.

These conditions allow to obtain an almost constant discharge flow through each of the holes, this flow being fixed by the nature of the discharged material, in particular is volumetric mass and its grain size and the geometry of the hopper, i.e. without specific means for controlling the discharge flow, such as a notched drum.

The contiguous compartmentalization walls (342, 343) of two successive compartments are connected together, in the bottom portion (320) of the hopper, by a sharp connection, said walls thus connected forming a tooth or a wedge, with a point angle less than 60°, preferably less than 40°, according to the respective inclination of the surfaces (342, 343) thus connected.

This characteristic ensures an easy separation of the flows towards the multiple holes of the hopper, and the absence of material residue in the hopper after its complete emptying.

As an informative and non-limiting example, the hopper of the device of the invention comprises 2 mm square holes, spaced apart according to an interval of 15 mm to 20 mm, the hopper has a total height of 40 mm, the height h of the separations, or height of the teeth, relative to the bottom of the hopper is comprised between 10 mm and 20 mm.

Such a hopper is adapted for the deposition of a layer of granular material according to a uniform thickness comprised between 0.3 mm and 0.8 mm, on the width of the hopper and according to a stroke of 500 mm, for granular materials such as silica sand, aluminum or stainless steel, the grain size D of which is comprised between 20 μm and 200 μm.

According to this example, the opening of a hole is at least equal to 10 times the grain size of the material deposited, but it is possible to use more reduced openings, while preserving a mass flow, the bottom limit of the possible opening being greater than 2 times the grain size of the material discharged. These dimensions show that although the term "hopper" is used, the hopper of the device of the invention belongs to a technical field different from that of industrial hoppers and is closer to a multi jet nozzle for depositing a granular material.

Figure 4:
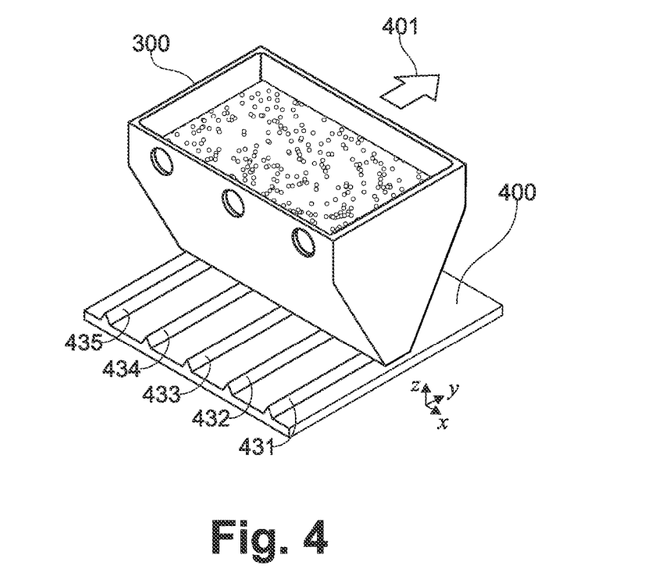
FIG. 4 illustrates, according to a perspective view, an example of deposition of a layer of material on a deposition surface, by means of the device of the invention.

FIG. 4, the operation of depositing material on a deposition surface (400) by means of the hopper of the device of the invention is represented without the scraper.

The final thickness, after scraping, of the layer of deposited material is a function of the dimensions of the part, of the implemented additive manufacturing method and of the targeted finishing.

As non-limiting examples, for parts contained in a volume less than or equal to 500 $cm^3$, the thickness of the deposited layers is comprised between 0.3 mm and 1 mm.

For parts contained in a volume of around 1 $m^3$ or more, the thicknesses of the deposited layers are greater than 2 mm.

For a hopper of given characteristics, the thickness of the deposited layer depends on the relative motion speed of the hopper relative to the deposition surface, the lower the deposition speed the thicker the deposited layer.

The quantity of deposited material depends on the flow of material delivered by the hopper, the larger the opening of the discharge hole the larger the flow rate.

According to this exemplary embodiment, the hopper (300) being filled with a granular material to be deposited is moved relative to the deposition surface, according to a constant speed (401).

According to various embodiments, this motion is obtained by moving the hopper or by moving the support on which the material bed is located.

During this movement, each hole deposits a pile (431, 432, 433, 434, 435) according to a deposition strip on the deposition surface (400).

When the scraper is separated from the hopper, this operation produces piles in strips, as represented in FIG. 4. When the scraper is fixed to the hopper and is moved with it, the piles are broken as the hopper (300) moves.

The discharge flow through each hole being constant due to the geometric characteristics of the hopper (300), as well as the constant relative motion speed (401), the cross-section of each pile is substantially constant in the longitudinal direction (x), the slope angle of the piles being defined by the deposited material.

For clarity of the figure, the piles (431, 432, 433, 434, 435) are here represented with a high slope angle and fairly spaced apart from one another. In practice, the slope angle is lower, generally around 30° such that the angle at the top of the piles is around 120°, without this value being limiting.

According to variants, the deposition is done in one single passage: the hopper is initially filled with the quantity of material to be deposited or a slightly greater quantity and is emptied during one single path along the deposition surface.

Alternatively, the deposition is done in two passages: the hopper initially filled with the necessary quantity of material or with a slightly greater quantity, is emptied during a back-and-forth motion above the deposition surface. According to this variant embodiment, the hopper is optionally offset laterally relative to the deposition surface, for example by half an interval of hole-spacing, during the return passage, such that the deposition on the surface is distributed in a more evenly manner.

Also, according to another variant, material reservoirs are positioned at the two ends of the path, and the hopper performs a first stroke after being filled through a first material reservoir, then a second stroke in the opposite direction after being filled through the material reservoir at the other end of the material bed. The two strokes are directly subsequent or separated by an additive manufacturing operation.

Figures 5, 5A, 5B:
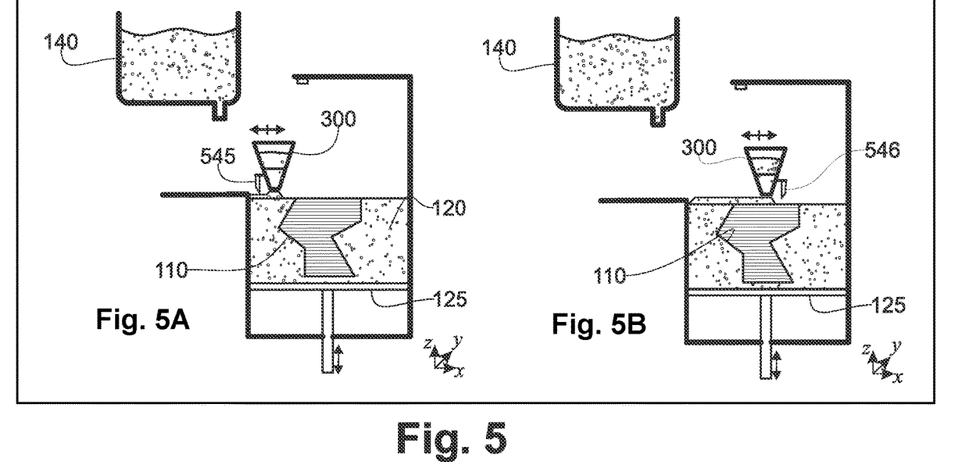

FIG. 5, according to schematic exemplary embodiments of the device of the invention, the hopper (300) is attached to a carriage (not represented) of the machine, that is movable in at least one direction (x) relative to the deposition surface. The hopper (300) is oriented such that the holes are aligned in a direction (y) perpendicular to this main motion direction.

The material bed (120) is placed on a plate (125) which can be moved vertically by suitable means.

Prior to the deposition of a material layer, the plate (125) is descended by a height corresponding to the thickness of the layer to be deposited.

The hopper (300) is filled with the suitable quantity of material from the material reserve (140). According to an exemplary embodiment, so as to allow the deposition of different materials on the material bed (120).

As an example, these different material reserves comprise materials of the same nature, but of different grain sizes, or materials of different natures, for example different metals.

FIG. 5A, according to this exemplary embodiment, a scraper (545) is connected to the hopper (300) behind it in the direction of its motion during discharge.

The bottom portion of the scraper is adjusted to the thickness of the deposited layer.

The hopper filled with material is moved at a constant speed above the deposition surface, and the scraper equalizes the layer of material deposited at the desired thickness, as it is deposited.

FIG. 5B, according to this exemplary embodiment, the scraper (546) is attached to the hopper (300) at the front of it in its motion direction during discharge. Thus, the hopper filled with material is moved at a constant speed above the deposition surface, then the layer is equalized by the scraper (546) during the return path of the hopper.

According to another embodiment (not represented), two scrapers are fixed to the hopper, one in front and the other at the aft, and are for example adjusted to different heights, such that a first equalization of the layer is done during the outward path, and a finishing equalization is done during the return path of the hopper.

According to an exemplary embodiment, the scraper is a simple ruler of parallelepiped cross-section.

Figure 6:
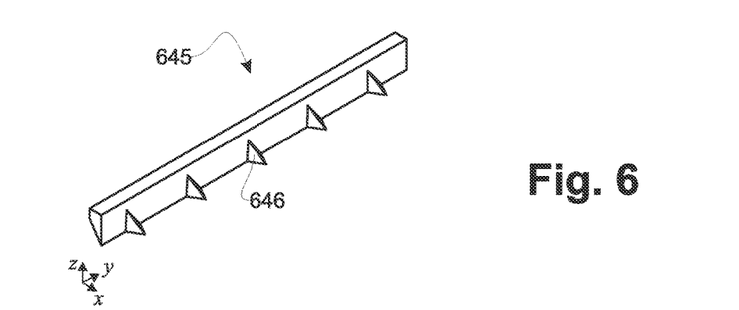
FIG. 6 represents, according to a perspective view, an exemplary embodiment of a scraper adapted to the device of the invention.

FIG. 6, according to another exemplary embodiment, the scraper (645), represented here in a configuration where it is placed behind the hopper, or one of the two scrapers if the device includes two of them, or both, comprises reliefs (646) vis-a-vis each hole of the hopper, to facilitate the distribution of the material deposited.

According to another variant (not represented), the scraper(s) is/are not attached to the hopper, but comprise their own motion means.

In this case, the scraper is implemented during the deposition, by following the hopper in its back-and-forth movement, or after the complete deposition of the material on the deposition surface.

The scrapers (645, 646) are here represented in their simplest embodiment, or in the general shape of rulers. Alternatively, said scrapers are rollers, the axis of rotation of which is perpendicular to the motion direction of the hopper, and which are adjusted to apply a certain compacting pressure on the layer of deposited material. Thus, this type of scraper allows both to distribute the layer of material deposited and to densify this layer.

According to an embodiment example, a roller-type scraper and a ruler-type scraper are associated with the hopper.

Figures 7, 7A, 7B:
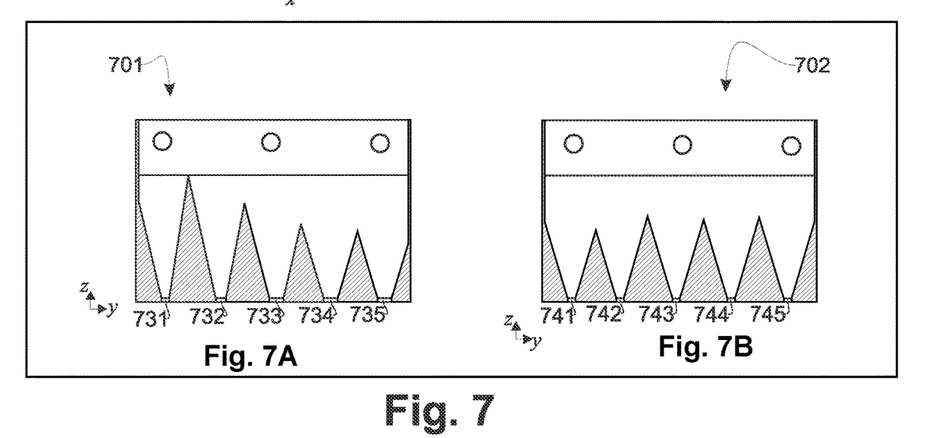
FIG. 7 represents exemplary embodiments of the compartmentalization of the hopper of the device of the invention.
FIGS. 7A and 7B show cross-sectional views.

FIG. 7, in all preceding examples, the discharge holes of the hopper are represented, distributed in the transverse direction according to a regular interval and with the same opening cross-section.

FIG. 7A, according to an exemplary embodiment, the hopper (701) of the device of the invention comprises different opening holes (731, 732, 733, 734, 735), for example the opening of which increases in the transverse direction.

This configuration allows to adapt the flow of material discharged through each hole as a function of the position of said hole.

For example, the hopper (701) such as represented is adapted to the deposition of a material on a deposition surface according to a circular path by means of a cylindrical robot.

Thus, during the use of the hopper, the hole (731) with the smallest opening follows a circular path closer to the curvature center and consequently according to a smaller radius, while the hole with the largest opening (735) follows a path farther away from the curvature center and with a larger radius.

The progressivity of the openings along the transverse direction, as well as the geometric characteristics of the compartmentalization walls, allow to obtain a greater flow of deposited material along the path with a large radius and smaller along the path with a small radius.

The geometric characteristics of the compartmentalization walls, more specifically their tilt angle, are determined by calculation and refined by experiment, the inclination of each wall always being less than 40° relative to the vertical. Thus, the opening angle between two compartmentalization walls converging towards a hole is for example smaller when the opening of the hole is reduced.

FIG. 7B, according to an embodiment, compatible with the preceding one, the holes (741, 742, 743, 744, 745) of the hopper (702) are distributed according to an irregular interval in the transverse direction.

According to this exemplary embodiment, the interval between the holes increases in the positive direction y, but the opposite may also be considered. Here again, the angles of the compartmentalization walls are adjusted, by remaining less than 40° relative to the vertical direction, so as to obtain a constant flow in all the holes or a progressivity of this flow from one hole to the other.

Whatever the embodiment or a combination of these embodiments, the flow of material through each hole is defined:
- by the characteristics of the deposited granular material, in particular its internal friction (friction between the grains);
- the opening cross-section of the hole;
- the tilt angle of the walls converging towards the hole, both for the compartmentalization walls and for the transverse walls of the bottom portion of the hopper;
- the height of the separation of the flows at the connections between the compartmentalization walls;
- the friction of the material deposited on the walls of the hopper.

The impacts of these parameters are connected. It is possible to define trends, which allow to design in its outlines a hopper adapted to a given case, then to refine this design by experiments.

Thus, the targeted flow is a mass flow, i.e. that all of the material contained in the hopper or in a conduit between two compartmentalization walls, flows at the same time through the different holes.

The more the opening cross-section of a hole is reduced, and the more the opening angle between the compartmentalization walls shall be reduced. The greater the targeted flow difference between two juxtaposed holes the more the separation of the flows shall take place upstream in the flow. Finally, the angles of the walls must be less than 40° relative to the vertical and preferably less than 30°.

Additionally, it is possible to reduce the friction between the discharged material and the walls of the hopper by a coating of said walls with a material exhibiting a low friction coefficient, such as Teflon®. To have a significant effect on the tilt angles which are permitted in walls, the friction coefficient between the coating and the material discharged by the hopper must be less than 0.1.

According to another embodiment, this apparent friction coefficient is reduced actively by subjecting one of the walls of the hopper, externally, to vibrations. To this end, an electric micro-vibrator is fixed onto an outer surface of the hopper, for example onto one of the inclined transverse walls. This type of vibrator comprises an electric motor driving at least one flywheel in rotation, the flywheel comprising flyweights generating the vibration, according to a frequency mainly comprised in the audible spectrum, typically comprised between 25 Hz and 500 Hz according to the type of vibrator.

For a small hopper, this function is for example made by one or more miniature vibrators such as those used in cellphones or video game controllers.

For a hopper adapted to producing large parts contained in a volume of 1 m³ or more, a vibrator such as distributed under the trademark OLI®, OLI S.p.a, Via Canalazzo, 35, I-41036 Medolla (MO) Italy, model Micro MVE, is adapted.

The lowering of the apparent friction coefficient between the product and the walls of the hopper, whether by coating, vibration or both, mainly has the effect of giving more flexibility in determining angles of the walls facing the openings of the holes, by allowing to use tilt angles approaching 40°, but which in any case, must remain less than this value, while preserving a mass flow.

Through the geometric characteristics of the hopper of the device of the invention, the material discharged on the deposition surface leaves no residue in the hopper.

Thus, it is possible to deposit two layers of different materials, but compatible together, in an additive manufacturing sequence, without proceeding with the cleaning of the hopper between the two deposition operations.

Figure 8:
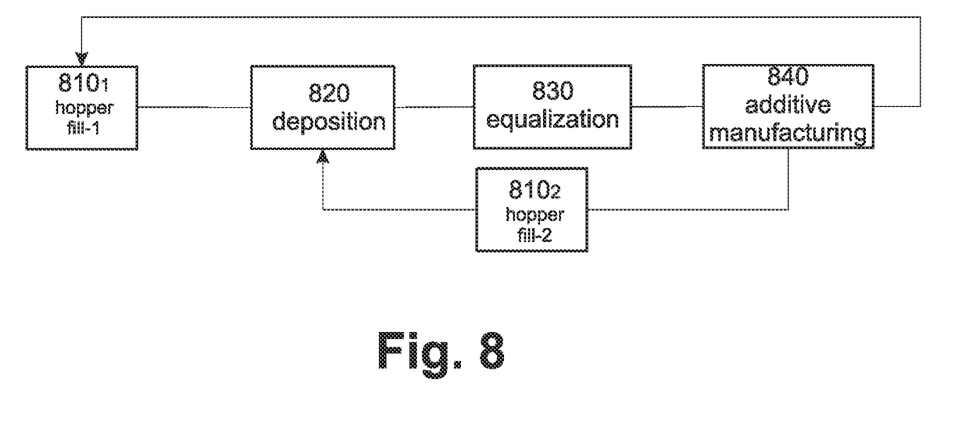
FIG. 8 is a flowchart of an exemplary embodiment of the method of the invention.

FIG. 8, according to an example of a method implementing the device of the invention, said method comprises a first step ($810_1$) of filling the hopper. This filling is advantageously done in a zone close to but outside of the material bed. The quantity of material loaded into the hopper is slightly greater than the quantity of material necessary for the layer to be deposited on the material bed to take into account the quantity discharged outside of the material bed.

According to a deposition step (820), the hopper is moved at a controlled speed relative to the deposition surface, where the discharging is done according to a deposition strip for each hole.

According to an equalization step (830), the piles are broken and distributed on the deposition surface by means of a scraper, of the ruler or of the roller type.

According to the variants, the scraper is attached to the hopper, such that the equalization step occurs at the same time as the deposition, or, the scraper is controlled separately, and the equalization step is done after the deposition.

With the layer being equalized, the deposited material is selectively agglomerated during an additive manufacturing operation (840).

According to a first possibility, the cycle resumes with a new filling of the hopper and the deposition of a new layer of the same material.

Alternatively, according to a step ($810_2$), the hopper is filled with another granular material after the additive manufacturing step. The subsequent operations thus resume with this second granular material.

The description above and the embodiment examples, show that the invention achieves the targeted aim, and allows to deposit, according to a uniform layer a granular material on a deposition surface, and to easily change the nature of the deposited material from one layer to the other, without an expensive operation of cleaning the deposition means. The device is simple and easily adaptable to a number of existing machines.

The invention claimed is:

1. A device to deposit a layer of granular material on a deposition surface, comprising: a discharge hopper; a scraper; and a transporter to move the discharge hopper and the scraper relative to the deposition surface;
    wherein the discharge hopper comprises: a plurality of discharge holes aligned in a transverse direction, an opening of each discharge hole being different in size; a top portion and a bottom conical discharge portion, the bottom conical discharge portion comprising two transverse walls inclined towards the plurality of discharge holes; a transverse compartmentalization of the bottom conical discharge portion, each compartment comprising two compartmentalization walls perpendicular to the two transverse walls of the bottom conical discharge portion and inclined towards the plurality discharge holes, so as to form a pyramid-shaped conduit in the bottom conical discharge portion, facing each discharge hole, consecutive compartmentalization walls of two compartments being connected in a wedged shape connection where the consecutive compartmentalization walls meet at the bottom conical discharge portion; and
    wherein a height of each wedged shape connection formed by the consecutive compartmentalization walls decreases as a size of the opening of the said plurality of discharged holes increases.

2. The device of claim 1, wherein a tilt angle, relative to a vertical direction of the two transverse walls of the bottom conical discharge portion and the two compartmentalization walls for a same hole, is less than or equal to 40°.

3. The device of claim 1, wherein an inside of the discharge hopper comprises a coating, a friction coefficient between the coating and the granular material deposited being less than 0.1.

4. The device of claim 1, wherein the discharge hopper comprises a vibrator installed on an outer wall.

5. The device of claim 1, wherein the plurality of discharge holes of the discharge hopper is distributed according to a uniform interval along the transverse direction.

6. The device of claim 1, wherein the discharge hopper comprises three holes or more, distributed according to a non-uniform interval along the transverse direction.

7. The device of claim 1, wherein the discharge hopper comprises a hole having an outlet cross-section different from that of another hole.

8. The device of claim 1, wherein the scraper is attached to the discharge hopper.

9. The device of claim 1, wherein the scraper comprises reliefs vis-a-vis each hole of the discharge hopper.

10. The device of claim 1, wherein the size of the opening of said plurality of discharge holes increases in the transverse direction.

11. The device of claim 1, wherein the transporter is configured to move the discharge hopper according to a circular path; and wherein a discharge hole with the smallest opening follows the circular path closer to a curvature center and a discharge hole with the largest opening follows the circular path farthest from the curvature center.

12. A method for depositing a layer of granular material on a deposition surface implementing the device of claim 1 and comprising steps of: i) filling the discharge hopper with a first granular material; ii) moving the discharge hopper above the deposition surface according to a predefined path traveling at a predefined speed; iii) depositing during step ii) the first granular material in continuous and parallel deposition strips on the deposition surface; (iv) spreading the first granular material deposited, using the scraper, on the deposition surface so as to obtain a layer of a uniform thickness.

13. The method of claim 12, further comprising, after step iv), steps of: (v) filling the discharge hopper with a second granular material, different from the first granular material; and (vi) repeating steps ii) to iv) with the second granular material.

* * * * *